LOCKING CIRCUIT AND CONTROL

Original Filed Nov. 23, 1945 3 Sheets-Sheet 1

INVENTOR
ROBERT E. SCHOCK.
BY Harry Tunick
ATTORNEY

INVENTOR
ROBERT E. SCHOCK,
BY Harry Tunick
ATTORNEY

LOCKING CIRCUIT AND CONTROL

Original Filed Nov. 23, 1945 3 Sheets-Sheet 3

INVENTOR
ROBERT E. SCHOCK
BY Harry Tunick
ATTORNEY

Patented Mar. 13, 1951 2,545,214

UNITED STATES PATENT OFFICE 2,545,214

LOCKING CIRCUIT AND CONTROL

Robert E. Schock, Riverhead, N. Y., assignor to Radio Corporation of America, a corporation of Delaware Original application November 23, 1945, Serial No. 630,429. Divided and this application April 16, 1948, Serial No. 21,462

2 Claims. (Cl. 250—20)

In my U. S. application Serial #630,429, filed November 23, 1945, now abandoned, I disclosed a new and improved cathode drive arrangement for a locking circuit having two conditions of stability. In said application, I disclosed and claimed a novel and simple direct current drive arrangement for the locking circuit in the form of a cathode follower stage, the cathode load impedance or a part thereof being included in the triggering circuit for the locking stage.

The improvement disclosed in said application is of wide application in the signalling art and use of my invention is so intended. However, a particular use I find for the same is in control of gating tubes in diversity systems, such as, for example, diversity receivers for telegraphy, and in particular for frequency shift signals.

In diversity receiver systems of certain types the same signal is picked up by antennas at spaced points or of different propagation intercepting characteristics. The best signal is used and to do so the same are compared to derive a potential which is used to select for use in the recording apparatus the said best signal. In my improved system, the derived potential is used as described above to drive a locking circuit which opens the gate tube coupled to that receiver or antenna having the best signal. A further object of my invention is to provide improved means for controlling a locking circuit by the potential derived by the signal quality sensing means.

In this application which is a division of said aforementioned abandoned application, I disclose improved means for deriving a control potential the absolute magnitude of which depends on which receiver of the diversity system is at that instant getting the best signal and improved means for applying the same to said control tube and improved means actuated by the locking circuit for selecting the best signal.

In accordance with my invention the signal quality sensing means comprises two differential detectors which produce two direct current potentials of a polarity which indicates which signal is best. A further object of my invention is provision of an improved differential direct current drive arrangement for the locking circuit which responds positively to the derived potentials.

In frequency shift signaling systems the signals are sent out by utilizing currents of different frequency alternatively present, one representing marking condition and the other representing spacing condition. The currents may be of high or low frequency, and in the latter case they may be impressed on a carrier as modulation and then recovered for recording purposes at the receiver. The marking and spacing currents are usually separated by several hundred cycles. My invention is in particular applicable to signalling circuits as disclosed in U. S. application Serial #632,978, filed December 5, 1945, which has now ripened into Patent #2,515,668, dated July 18, 1950.

Figure 1:
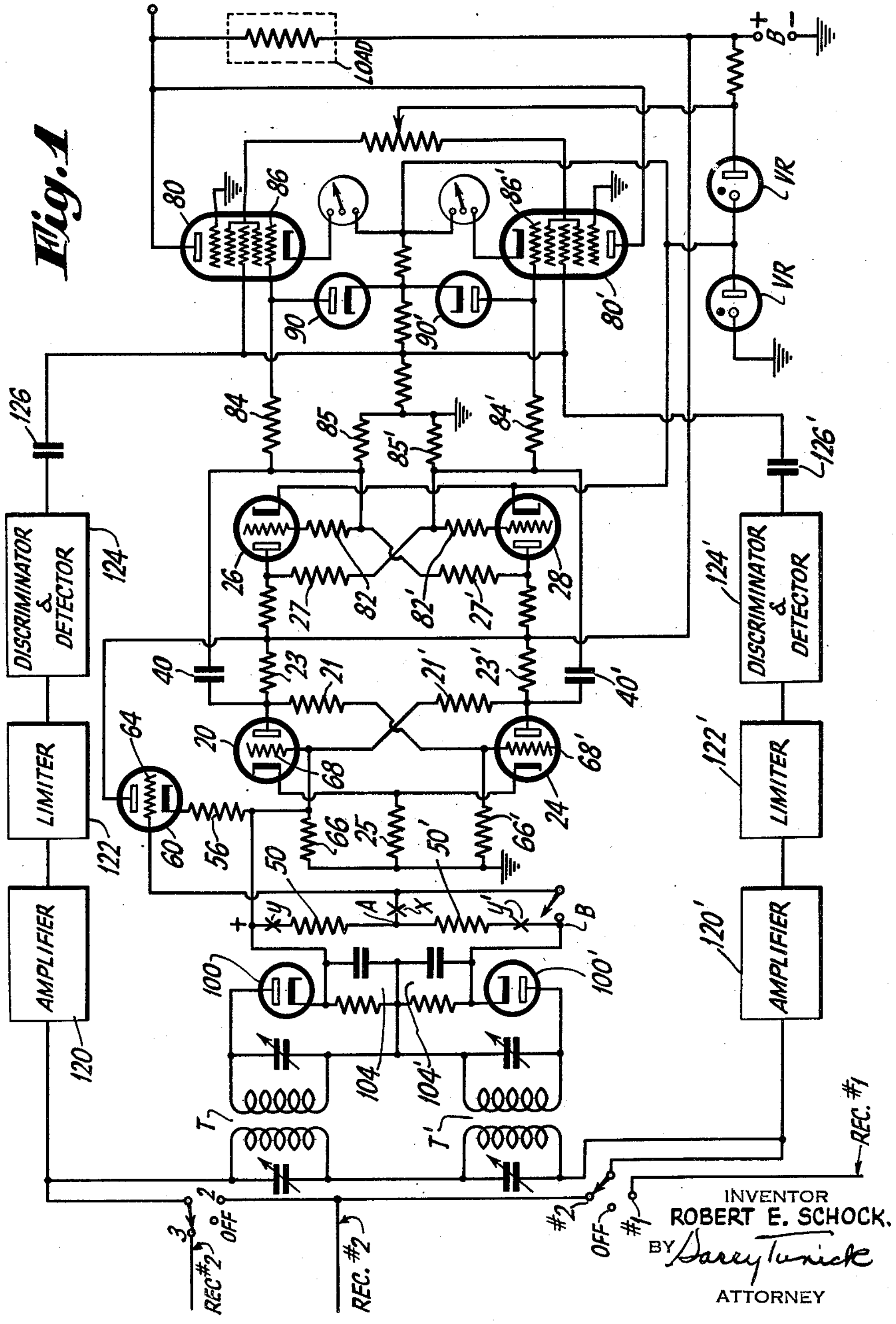
Figure 2:
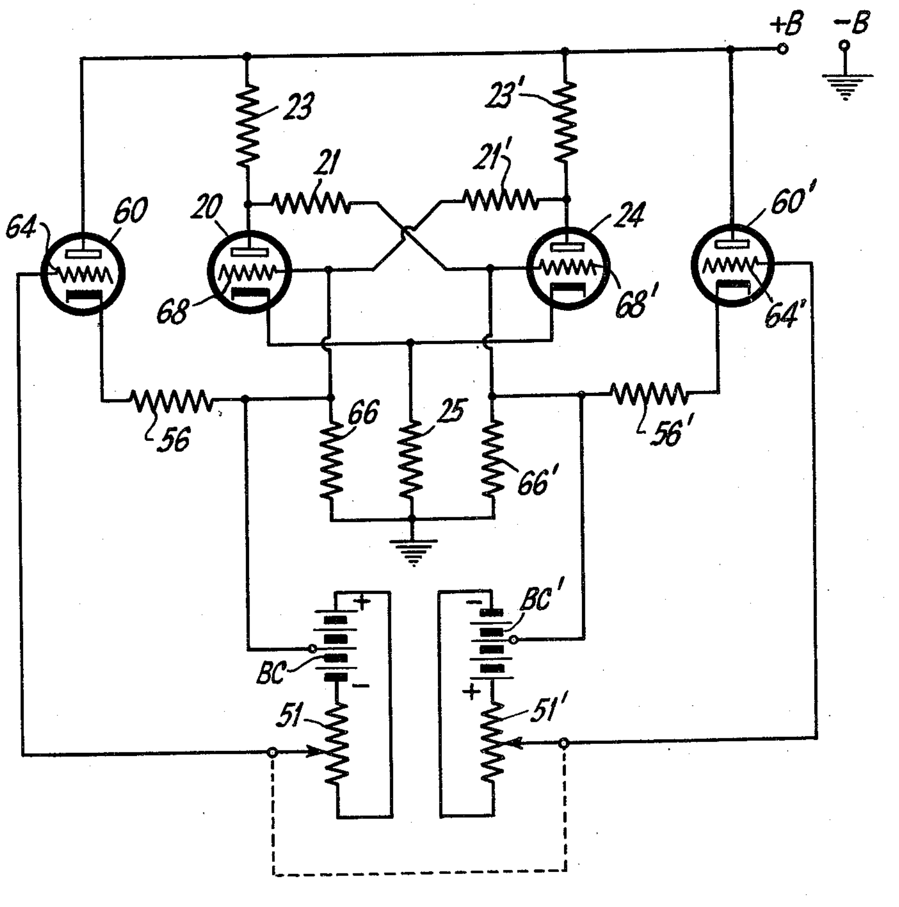
Figure 3:
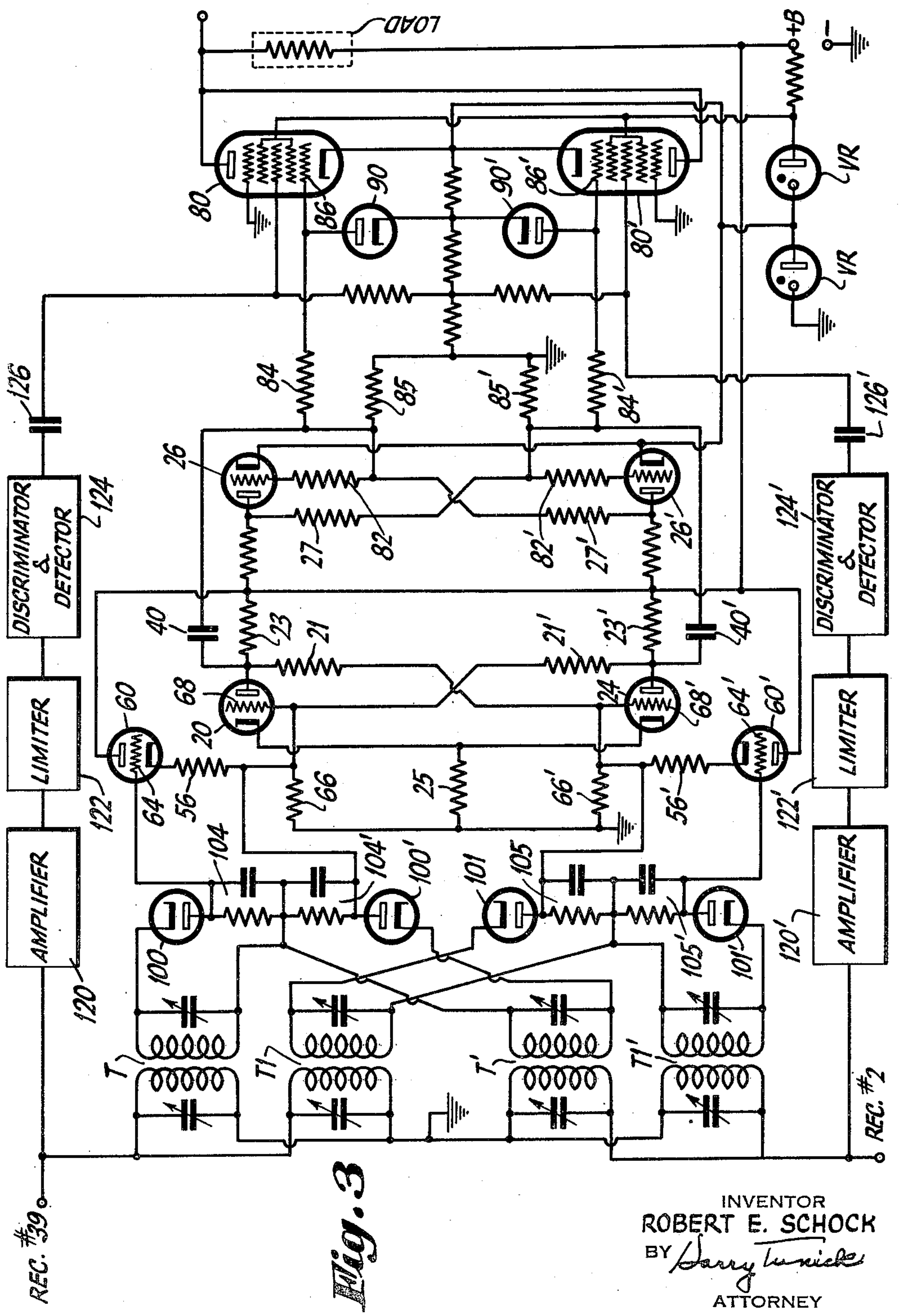

In describing my invention in detail reference will be made to the attached drawings wherein Figs. 1 to 3 each illustrate a locking circuit and an improved control therefor arranged in accordance with my invention. In Fig. 1 the locking circuit is also included in a gating tube control arrangement as applied to a diversity receiver system. The direct current locking circuit drive of Figs. 2 and 3 are similar, Fig. 2 being a simplified version of the arrangement of Fig. 3, which is added to expedite explanation of my invention.

Referring now to Fig. 1, the triggering or locking circuit to be controlled comprises tubes or electrode structures 20 and 24. These electrode structures have their anodes and control grids cross-coupled by resistors 21 and 21' and their anodes connected to a direct current source by resistors 23 and 23', and their cathodes connected to ground by resistor 25 to form a tripping circuit somewhat of the nature disclosed in Finch U. S. Patent #1,844,950. Where faster tripping action is necessary a double locking circuit is used and may then be as illustrated in Fig. 1. The double locking circuit includes additional tubes 26 and 28 with their anodes and control grids cross-coupled by resistors 27 and 27', as shown, to form a second locking circuit. The control grid of tube 26 is coupled to the anode of tube 20 by a capacitor 40, while the control grid of the tube 28 is coupled to the anode of the tube 24 by a capacitor 40'. The arrangement is such that when current is caused to flow in say tube 20, the potential at the anode of this tube drops slowly for a portion of the tripping cycle. The potential at the control grid of tube 24 likewise falls slowly so that current through the tube 24 is reduced slowly for a part of the locking or tripping action. At the end of the tripping action the current through 20 grows rapidly to saturation so that the potential on the anode end of capacitor 40 falls sharply and this applies a quickly falling potential to the control grid of tube 26. At the same time a sharply rising potential is applied by the capacitor 40' to the control grid of tube 28 so that abrupt triggering action takes place in the final locking stage including tubes 26 and 28. When tube 20 is conductive tube 26 is cut off. When tube 20 is conductive tube 24 is also cut off, while the tube 28 is conductive. The locking circuit has two positions or conditions of stability, i. e., with current cut off in tubes 24 and 26 or vice versa. Once the circuit is triggered to one condition of stability it remains there until the potential on the grid of tube 20 changes in a direction to trigger the locking circuit to the other condition of stability. The double locking tube circuit is as disclosed in U. S. application Serial #632,978, filed December 5, 1945, Patent #2,515,668, as are the gating tubes 80 and 80', their use and their coupling by resistances 84 and 84' over grid bias clamping tubes 90 and 90' etc. to the locking circuit. They are also described to the extent necessary hereinafter.

The triggering of the locking circuit is to be controlled in accordance with a direct current potential of varying magnitude such as might appear across resistor 50. Assume, for example, that the potential at the upper end of resistor 50, say at Y, is about zero, or slightly positive, and that potential at the lower end of resistor 50 varies from a value substantially equal to the potential at Y to a positive or negative value. The end Y of the resistor 50 is connected by resistor 56 to the cathode of a direct current trigger driver or control tube 60. The control grid 64 of this tube is connected to the other end of resistor 50. The potential at the point A varies up and down with respect to zero potential and the triggering action is to be controlled in accordance with this potential. The tube 60 is a cathode follower stage and its cathode is connected by resistor 56 and resistor 66 to ground. The resistor 66 is also in the direct current bias circuit for the control grid 68 of the locking circuit tube 20. When the potential at the point A becomes less negative, more current flows in the tube 60, whereas when the potential at the point A becomes more negative, less current flows in the tube 60. The potential drop on the grid 68 depends upon the current flowing in resistors 56 and 66, i. e., in the tube 60 and this potential at grid 68 is positive at all times. However, the cathodes of tubes 20 and 24 are also positive by the amount of potential drop across resistor 25. The grid 68 potential is as a consequence slightly negative with respect to the cathode potential. Tube 60 is self-biased to the middle of its operating range so that when the potential across resistor 50 is zero tube 60 is in the middle of its operating range. When A swings negative with respect to Y tube 60 draws less current through resistors 56 and 66 so that the potential at the grid 68 becomes more negative and current is cut off in tubes 20 and 28 and flows in tubes 24 and 26. When the potential at A swings less negative the current flow in resistors 56 and 66 increases to provide at the control grid 68 a less negative potential so that current flows in the tubes 20 and 28, and is cut off in tubes 24 and 26.

The potentials at the anodes and grids of tubes 26 and 28 and at various points in the circuit of this stage vary differentially through a range which is large as compared to the variation of the potential at point A. These differential potentials appear across resistors 85 and 85' for use as desired. They vary between a small positive value and a relatively large negative value. In the example illustrated, they are used to control the conductivity of the pair of gate tubes 80 and 80'. The control grids of tubes 26 and 28 are connected to the control grids of tubes 80 and 80' by resistors 82 and 84, and 82' and 84'. Thus the potentials on the control grids 86 and 86' are varied differentially with respect to the cathodes of tubes 80 and 80'. The resistors 82 and 82' serve as described in U. S. application Serial #618,760, filed September 26, 1945, now Patent #2,511,093, dated June 13, 1950, to provide on the control grids 86 and 86' potentials which vary differentially through a wide range in accordance with variations in the potential at A and/or at grid 68.

The potential developed across resistor 50 may be of a magnitude which varies in a direction to indicate which of two receivers has the best signal. The arrangement may then be as described in said U. S. application Serial #632,978, filed December 5, 1945, Patent #2,515,668. A pair of differential diodes 100 and 100' are respectively coupled by tuned intermediate frequency transformers T and T' to the IF output of a receiver (not shown) designated #3, and IF output of the same frequency from a receiver (not shown) designated #2. The transformers T and T' (which may operate at 50 kc.— the frequency shift FS) are broadly tuned so that they will pass, without substantial frequency selection or attenuation of any part of the frequency spectrum, a band of frequencies sufficiently wide to include the mark and space frequencies transmitted by the frequency shift transmitting system. The transformer T and rectifier 100 and transformer T' and rectifier 100' form a differential detector system by means of which potentials are developed across the cathode circuits 104 and 104' in opposed polarity. The networks 104 and 104' filter out the alternating current components of intermediate frequency and leave the direct current components which are of amplitudes depending on signal strength. When the receiver connected with transformer T gets the best signal the potential drop across the unit 104 is greater than the potential drop across the unit 104'. Since the cathodes of both diodes 100 and 100' are relatively positive the potential at the point A will be more negative when the current flow in diode 100 is largest and less negative when the current flow in diode 100' is greatest. Thus the potential at the point A varies in a direction, positive or negative relative to the potential at Y, depending upon which signal is strongest. The time constants of networks 104 and 104' are large so that the direct current potentials vary slowly in accordance with signal strength but do not follow faster variations of say audio frequency.

The tubes 80 and 80' may be gating devices in a diversity receiver, in which case the output of receiver #3 may be also coupled to a grid in the device 80 by an IF amplifier 120, a current amplitude limiter 122, and a frequency discriminator and amplitude modulation detector 124, and condenser 126. The #2 receiver may be similarly connected to a grid in the gating device 80' by an amplifier 120', a limiter 122', a discriminator 124', and a coupling condenser 126'. The arrangement is again as illustrated in said U. S. application Serial #632,978, filed December 5, 1945, Patent #2,515,668.

In some cases a larger direct current driving potential is desired on the control grid 64. Then the connection between this control grid and the point A may be broken say at X and the grid 64 is then connected to the point B by say a switch or by permanent connection. Then the total drop across the units 104 and 104′ may be utilized. Resistors 56 and 56′ may then be removed by breaking the circuits at the points Y and Y′.

Where a balanced direct current driving circuit for the locking tubes is desired, an arrangement as illustrated in Fig. 2 may be used. In the circuit of Fig. 2 a cathode follower drive stage including tube 60 and tube 60′ is supplied for each side of the locking circuit. The tube 60 is connected as in Fig. 1. The tube 60′ is similarly connected to the control grid 68′ of tube 24. Resistors 56 and 56′ are of about like value and resistors 66 and 66′ are of about like value. This embodiment by being so arranged provides a completely balanced locking circuit with a substantially completely balanced differential direct current drive tube arrangement therefor. The tubes 60 and 60′ are of the cathode follower type and have the points between their cathode resistors 56 and 66 and 56′ and 66′ connected to the control grids 68 and 68′ respectively of tubes 20 and 24. This includes the resistors 66 and 66′ in the grid bias circuits for tubes 60 and 60′ respectively. The potentials on the control grids 64 and 64′ of the cathode follower stages are varied differentially. To simplify the arrangement I have shown the same as being supplied by differentially operated potentiometers 51 and 51′. However, it must be noted that the potential source BC′ has its polarity reversed with respect to the potential source BC so that when the potential on the control grid 64′ becomes more negative the potential on the control grid 64 becomes less negative and vice versa.

In Fig. 3, I have illustrated a circuit arrangement for deriving differentially varying direct current potentials for control of the tubes 60 and 60′ of an arrangement as in Fig. 2. Moreover, in this Fig. 3 the differential potentials vary in a direction to denote which of two receiver signals is the best. The locking circuit as controlled drives a second or cascaded locking stage as in Fig. 1. The double locking stage controls a pair of gating tubes also as in Fig. 1. The arrangement of Fig. 3 is as in Fig. 1 and Fig. 2, except as otherwise noted hereinafter. The transformers T, T1, T′ and T1′ are tuned as described in connection with transformers T and T′ in Fig. 1. Transformers T and T1 each have a primary winding coupled to one receiver and a secondary winding coupled to one diode of two pairs of diodes 100, 100′ and 101 and 101′. Transformers T′ and T1′ are similarly coupled by their primary windings to receiver #1 and by their secondaries to the other diodes of said pairs of diodes. The transformers T and T′ provide across the differential rectifier units 104 and 104′ differentially varying potentials as in Fig. 1 for control of the direct current trigger control tube 60. Note that the potentials across units 104 and 104′ as applied between the grid and cathode of tube 60 vary in a direction depending upon which receiver has the best signal. The transformers T1 and T1′ are similarly coupled to the differential detectors 101 and 101′ with their load units 105 and 105′. It will be noted that in Fig. 1 the differentially connected diode rectifier loads are between the cathodes of the rectifiers, whereas in Fig. 3 these loads are between the anodes of the diode rectifiers. The potentials at the anode ends of the load units 104 and 104′ are negative and the potentials oppose. It will be seen then that when the receiver #3 has the strongest signal the grid 64 of tube 60 will become more negative or less positive, and when the #2 receiver has the strongest signal the grid 64 of tube 60 will become more positive or less negative. On the contrary, when the #2 receiver has the best signal the grid of tube 60′ will become less negative or more positive, and when the #2 receiver has the best signal the grid 64′ of tube 60′ will become more negative or less positive. This provides the differential control action necessary to operate the balanced trigger circuit as stated in connection with Fig. 2. The gating tubes are controlled as described in connection with Fig. 1 to let pass the signal from the #3 receiver or from the #2 receiver, depending upon which receiver has the best signal as determined by the pair of differential rectifiers supplying the direct current driving potential for the locking circuit control tubes.

What is claimed is:

1. In a diversity system, two radio receiver devices responsive to signal energy, a gating device coupled to each receiver, said gating devices having electrodes, a common output circuit coupled to output electrodes of the gating devices, a locking circuit including two electrode structures having two conditions of stability in which one structure is conductive and the other non-conductive and vice versa, couplings between points on the locking circuit at which differentially varying potentials appear and corresponding electrodes in the two gating devices, two differential rectifier systems each coupled to both receivers for providing two control potentials one for each structure of the locking circuit, and a locking circuit driver tube, one for each provided control potential, coupling each differential rectifier system to a different structure of the locking circuit.

2. In a diversity system, two radio receiver devices responsive to signal energy, a gating device coupled to each receiver, a common output circuit coupled to the gating devices, a locking circuit including two electrode structures having their input and output electrodes cross-coupled to provide only two conditions of electrical stability in each of which a corresponding one of the structures is conductive and the other nonconductive, a differential coupling between the locking circuit and the two gating devices, two differential rectifier systems each coupled to both receivers for providing two control potentials one for each structure of the locking circuit, and separate means, one for each provided control potential, coupling each differential rectifier system separately to a different structure of the locking circuit.

ROBERT E. SCHOCK.

REFERENCES CITED

The following references are of record in the file of this patent:

UNITED STATES PATENTS

| Number | Name | Date |
|---|---|---|
| 2,269,594 | Mathes | Jan. 13, 1942 |
| 2,414,111 | Lyons | Jan. 14, 1947 |
| 2,478,977 | Nicholson | Aug. 16, 1949 |